United States Patent [19]
Scharfman et al.

[11] Patent Number: 5,693,349
[45] Date of Patent: Dec. 2, 1997

[54] METHOD FOR MAKING A SWEETENED NATURAL CHEESE

[75] Inventors: Paul Scharfman, Madison; Ludwig Zoller, Watertown, both of Wis.

[73] Assignee: Specialty Cheese Company, Inc., Lowell, Wis.

[21] Appl. No.: 484,648

[22] Filed: Jun. 7, 1995

[51] Int. Cl.$^6$ ............................................. A23C 9/12
[52] U.S. Cl. ........................... 426/36; 426/34; 426/42; 426/582; 426/658
[58] Field of Search ............................ 426/34, 36, 38, 426/39, 548, 580, 582, 658, 42

[56] References Cited

U.S. PATENT DOCUMENTS

| | | |
|---|---|---|
| 1,163,066 | 12/1915 | Carpenter . |
| 1,578,820 | 3/1926 | Gere . |
| 1,594,627 | 8/1926 | Meyers . |
| 1,745,962 | 2/1930 | Thompson . |
| 2,009,136 | 7/1935 | Grelck . |
| 2,065,183 | 12/1936 | Harris . |
| 2,989,400 | 6/1961 | Baumann . |
| 3,117,008 | 1/1964 | Mauk . |
| 3,118,769 | 1/1964 | Pletcher . |
| 3,591,390 | 7/1971 | Flickinger et al. . |
| 3,737,325 | 6/1973 | Engel . |
| 4,160,044 | 7/1979 | Invernizzi et al. . |
| 4,172,900 | 10/1979 | Dooley . |
| 4,497,834 | 2/1985 | Barta . |
| 4,599,313 | 7/1986 | Gonzalez . |
| 4,689,234 | 8/1987 | Ernstrom et al. . |
| 4,917,905 | 4/1990 | Guy et al. . |
| 4,957,751 | 9/1990 | Lehmann et al. . |
| 4,965,078 | 10/1990 | Van Leeuwen et al. . |
| 4,970,083 | 11/1990 | Akahoshi et al. . |
| 5,431,946 | 7/1995 | Vesely et al. ..................... 426/582 |

FOREIGN PATENT DOCUMENTS

| | | |
|---|---|---|
| 565058 | 10/1958 | Canada . |
| 1152234 | 7/1986 | Japan . |
| 3164843 | 7/1988 | Japan . |
| 1600667 | 10/1990 | U.S.S.R. . |

*Primary Examiner*—Leslie Wong
*Attorney, Agent, or Firm*—Peterson, Wicks, Nemer & Kamrath

[57] ABSTRACT

A cheese which is natural, resists melting, includes a pH of between about 5.9 and about 6.35, is made in the absence of and includes no cheese culture, is packaged in block form and is sliceable with a knife without crumbling, and includes a nonlactose sweetener having a perceived sweetness at least 30% that of sucrose. Methods for making the sweetened cheese preferably in the absence of cheese culture are also disclosed.

16 Claims, No Drawings

METHOD FOR MAKING A SWEETENED NATURAL CHEESE

BACKGROUND

The present invention relates generally to cheese, particularly to sweetened cheese, and specifically to natural cheese which has been sweetened with a nonlactose sugar that is sweet to the tongue.

Cheese is a fresh or matured product, obtained by the drainage of liquid after the coagulation of milk, cream, skimmed or partly skimmed milk or a combination thereof. Whey cheese is the product obtained by concentration of whey with or without the addition of milk or milk fat.

Cheesemaking is a way of preserving milk. Cheese production converts a short shelf life product milk into a long shelf life product cheese.

Generally, cheese is made as follows: 1) Milk, raw or pasteurized, is warmed. 2) Starter cultures are added, followed by the rennet. The lactose in the milk is fermented by starter cultures (such as a lactic acid bacteria) to produce lactic acid and provide a fresh acidic flavor to the cheese. Further, the lactic acid helps to give the right texture to the curds and acts as a preservative. Rennet is an enzyme which coagulates the milk protein. 3) The coagulum formed is cut and stirred to release the whey and determine the moisture content of the curd. 4) The temperature of the mixture of curds and whey is raised, which is a process known as scaling. 5) The whey is drained off. Whey is typically about 93.3% water, 0.4% fat, 0.8% protein, 4.9% lactose, and 0.6% ash. 6) The curd is distributed into molds and left to drain naturally or under pressure (hard-pressed) to reduce the residual moisture. 7) The demolded cheeses are treated in specific ways which influence the final flavor characteristics (salted, waxed, pierced, smeared or mold-sprayed) and left to ripen—or mature—in controlled environments. For the purposes of the present invention, such cheeses are referred to as traditional firm cheeses, as opposed to spoonable cheese such as cottage cheese.

The combination of the amounts of starter culture and rennet used, the temperature and length of time they are left to develop, the required level of acidity and the way in which the curd is handled, together with the enzymatic action of additional bacterial or mold cultures necessary for certain types of cheese, lead to the development of a texture and flavor characteristic of each individual cheese.

All milk has significant concentrations of lactose (roughly 4–5%). Traditional firm cheesemaking utilizes cheese cultures to metabolize the lactose in milk. This results in cheese that has much lower lactose concentration than milk (usually less than 0.2%), and in cheese which has significant acid development (pH<5.8). Such traditional firm cheeses with pH<5.8 are, therefore, low in sugar and generally not sweet tasting. There are several Scandinavian cheeses derived from whey which are modestly or barely sweet tasting because they are high in lactose. There are also some of traditional firm cheeses with pH<5.8 that have been produced with savory seasonings in them (e.g. Monterey Jack with garlic seasoning) and some that have been produced with fruit pieces in them, some of which fruit may have been sweetened in a sugar solution (e.g. Muenster cheese with sugared cherry bits, Monterey Jack cheese with apple pieces) but these traditional firm cheeses have not been produced with nonlactose sweeteners added directly to them.

There are some cheeses that have little or no acid development. These are cheeses whose cultures do not significantly metabolize the lactose in milk—or cheeses that have no culture at all. These cheeses are not sweet tasting despite the fact that they have higher concentrations of lactose than traditional firm cheeses because lactose is not very sweet tasting. These cheeses have not been made with nonlactose sweeteners added to them.

One significant barrier to the use of nonlactose sweeteners in the manufacture of high pH cheeses is the increased risk of bacterial growth. This undesirable bacterial growth can take two forms. It can be growth of undesirable pathogenic bacteria or it can simply be the accelerated growth of the cheese culture associated with the addition of sugars such as sucrose or fructose. In the former case, the cheese can be unsaleable because it is contaminated. In the latter case, the cheese can be unsaleable because too much acid has been generated by the metabolizing of the sugars by the cheese culture. This increased acid production is a major defect in cheeses that are supposed to be low in acid (pH>5.8) Another significant barrier to the manufacture of such cheeses is that the addition of sugars tend to make the finished product more crumbly than it normally is, thus hard to package in a block form.

As to different varieties of cheese, and methods for producing cheese, please see the article "Cheeses", (the totality of which is hereby incorporated by reference) found on pages 802 to 856, Volume Two, *Encyclopaedia of Food Science, Food Technology and Nutrition*, copyright 1993 by Academic Press Limited.

SUMMARY

Accordingly, a general object of the present invention is to provide a uniquely sweetened cheese and unique methods for making the sweetened natural cheese.

Another object of the invention is to provide such a cheese which uniquely has been made without cheese culture, and which as a finished product includes no cheese culture.

Another object of the invention is to provide such a cheese which uniquely has nonlactose sugars such as sucrose and fructose. Even natural cheese with a relatively large amount of lactose does not taste sweet because lactose imparts to the tongue low levels of perceived sweetness. In contrast, only a relatively small amount of a sugar such sucrose or fructose is required to produce a sweet taste.

Another object of the invention is to provide such a cheese which uniquely is a natural cheese. Processed cheeses are made by heating natural cheese in the presence of suitable emulsifying salts.

Another object of the invention is to provide such a cheese which uniquely has a pH of between about 5.9 and about 6.35. (Cheese with no acid development has the pH of milk of about 6.8).

Another object of the invention is to provide such a cheese which uniquely is nonmelting (i.e. resists melting). Nonmelting cheese is cheese whose base area increases by less than 20% when cut into a cube of one-half inch (1.27 cm) per side and placed for five minutes in a oven preheated to 350° F. (176.67° C.).

Another object of the invention is to provide such a cheese which uniquely has a relatively high moisture content. A moisture content above about 40% is preferred.

Another object of the invention is to provide such a cheese which uniquely is sufficiently solid to be packaged in solid form. The cheese can be eaten without the use of a spoon. The cheese is sliceable with a knife. The cheese may be crumbled by hand if desired.

Another object of the invention is to provide such a cheese which uniquely includes fruit pieces.

Another object of the invention is to provide such a cheese which includes the unique combination of a sweetened, natural, nonmelting cheese made in the absence of cheese culture which has little or no acid development, and which is sufficiently solid to be packaged in solid form.

Another object of the present invention is to provide unique steps to the method of making the sweetened natural cheese. One such step is to mix in nonlactose sugar with curd coagulated in the absence of cheese culture. Another such step is to mix the nonlactose sugar in the curd after whey has been drained from the curd and prior to the curd being pressed. Another such step is to mix the nonlactose sugar in the curd either during or after salt has been mixed in with the curd and permitted to interact with the curd.

Another object of the present invention is to provide such a cheese which uniquely has a long shelf life of one to three months or more despite it high pH, high moisture, and high sugar content.

Surprisingly, all of the above objectives can be satisfied in the food product field by the preferred teachings of the present invention, detailed descriptions of which are provided below.

DESCRIPTION

It can be appreciated that cheese may be broken down into mutually exclusive subcategories. 1) Cheese may be either natural or processed. The present invention is directed at natural cheese. 2) Natural cheese can have a wide variety of pH values. For example, pH of natural cheese may be either below about 5.9, above about 6.35, or between about 5.9 and about 6.35, which is the range of the finished cheese according to the present invention. 3) Natural cheese can be either sliceable or so soft that it must be packaged in a cup (e.g. cottage cheese). The present cheese is finished in block form and is sliceable. 4) Sliceable natural cheese with pH of about 5.9 to about 6.35 can be either easy to melt or can resist melting. The present finished cheese resists melting. 5) Sliceable natural cheese with a pH of about 5.9 to about 6.35 that resists melting can have a high concentration of milk sugar (lactose) without tasting sweet because lactose imparts to the human plate low levels of perceived sweetness. Sliceable natural cheese with pH of about 5.9 to about 6.35 that resists melting can, therefore, taste sweet or not. The present finished product tastes sweet.

The process of the invention generally includes the steps of coagulating the milk (cheese making) in the absence of a cheese culture to make the cheese curd, then draining whey from the cheese curd, then adding salt and sweeteners to the cheese curd mixture, and then pressing the cheese curd mixture.

Milk is the starting material. Milk used in the present invention preferably is selected from cow, ewe, goat, or buffalo milk. Cow milk is most preferred. The milk may be raw or pasteurized. Pasteurized milk is preferred. Generally, the milk may be from any animal or reconstituted milk using dehydrated or condensed milk or caseinates.

The milk is then pasteurized. Preferably it is pasteurized in non-traditional means to incorporate denatured whey proteins into the final cheese product. The denatured whey proteins help the final cheese product to resist melting. (Other ways to make a cheese that resists melting include direct vat acidification, and traditional pasteurization (in any time/temperature combination that achieves pasteurization) followed by addition of a cheese culture that is susceptible to heat and/or salt. For instance, using a cheese culture that is a blend of Lactis and Cremoris strains, such as Marschall Products LF 1 and LF 2, will work. Such a blend of cultures will have their metabolisms arrested when the temperature is elevated above 110°–125° F. (43.33°–51.67° C.). These cultures will also have their metabolisms arrested when salt is added to the curd.) In the preferred embodiment, the milk is pasteurized in a High Temperature Short Time Pasteurizer. It should be noted that, if desired, one may use a vat pasteurizer to denature whey proteins by heating the vat to above 180° F. (82.22° C.) and holding the milk at that temperature for 25 seconds or more while stirring the milk to prevent it from burning onto the sides of the vat.

The ranges of pasteurization to denature some of the whey proteins (not all the whey proteins are denatured) include the range of 170° F. to 215° F. (76.67°–101.67° C.) if one holds the milk for more than a minute at the low end of the range and if one prevents burn-on of the scalded milk onto the pasteurizer. At the high end of this range one holds the milk for more than 20 seconds while preventing burn-on. Preferably, one pasteurizes at 175° F. to 185° F. (79.44°–85° C.) given the difficulties of preventing burn-on in a pasteurizer. Most preferably, one pasteurizes between about 179° F. to 182° F. (81.67°–83.33° C.) for between about 28 and about 32 seconds.

Using a metering injection pump, phosphoric acid is injected into the raw milk line leading to the regeneration section.

As the milk enters the vat, the milk is acidified to a pH of preferably about 6.45 to about 6.1, more preferably about 6.40 to about 6.2, and most preferably about 6.35 to about 6.25.

In the cheese make procedure, rennet is added to the milk. The rennet may include standard rennet (i.e., calf rennet, derived from the stomachs of young milk-fed calves), 50/50 rennet, which contains a proportion of bovine or porcine pepsin and pure calf chymosin, microbial rennets, plant rennets, and genetically engineered chymosin which is identical to calf rennet.

For every one thousand pounds (453.6 kg) of milk, rennet is added in the range of preferably about 1½ ounces (42.5 g) w/w to about 5 ounces (141.8 g) w/w, more preferably from about 2 ounces (56.7 g) w/w to about 4 ounces (113.4 g) w/w, and most preferably from about 2½ ounces (70.9 g) w/w to about 3 ounces (85.1 g) w/w. Before being added, the rennet is usually diluted with about forty volumes of cold chlorine-free water. It should be noted that chlorine may destroy the rennet.

If desired, calcium chloride may be added to the milk prior to the make procedure. Successful coagulation of the milk may depend upon the calcium balance in the milk. For every one thousand pounds (453.6 kg) of milk, calcium chloride is added in the range of preferably about 1 ounce (28.4 g) to about 6 ounces (170.1 g), more preferably from about 2 ounces (56.7 g) to about 6 ounces (170.1 g), and most preferably from about 2 ounces (56.7 g) to about 4 ounces (113.4 g). Before being added to the milk vat, the calcium chloride is preferably diluted with about forty volumes of cold chlorine-free water.

At this point, it should be noted that the cheese production technique of the present invention preferably excludes cheese cultures, such as starter cultures. Excluding the cheese culture precludes the problem of the added sugars driving the cheese culture to produce excessive acid. Further, the finished product includes no cheese culture.

At this point it should also be noted that coagulation of the milk may be accomplished either by enzymatic coagulation (using rennet) or by acid coagulation or by coagulation using a combination of acid and heat. Enzymatic coagulation is preferred because acidic coagulation may produce a cheese curd having a pH which is undesirably low. In general, cheese curd is made from milk in any manner which maintains the curd above 5.9 and below 6.4 but which preferably does not use any cheese culture (e.g. direct vat acidification).

One cheese making vat which may be used for the present invention is model number RDA 2605 300-1156/66 ¼ available from Stoelting, although any cheese vat including "double 0" type vats can function adequately for this invention.

For the cheese make procedure, the temperature of the vat is set in the range preferably from about 88° F. to about 95° F. (31.11°–35° C.), more preferably from about 89° F. to about 94° F. (31.67°–34.44° C.), and most preferably from about 91° F. to about 93° F. (32.78°–33.89° C.). The time is set in the range preferably from about 15 minutes to about 45 minutes, more preferably from about 20 minutes to about 40 minutes, and most preferably from about 25 minutes to about 35 minutes. The purpose of this step is to coagulate the milk and hence this step may be referred to as the coagulation step or the cheese making step.

After coagulation, the curd is cut to expel moisture. The curd can be cut many times, preferably once or twice and most preferably only once. Cutting the curd provides an increased surface area from which the whey can be expelled. The cut of the curd knife size is preferably from about ⅛ inches (0.32 cm) to about 1½ inches (3.81 cm), more preferably from about ⅜ inches (0.95 cm) to about ½ inches (1.27 cm), and most preferably at about ⅜ inches (0.95 cm). The pH at cut is preferably between about 6.45 and about 6.15, more preferably between about 6.35 and about 6.20, and most preferably about 6.35 to about 6.25.

After coagulation and being cut, the curd is allowed to heal, without agitation. The heal time is in a range of preferably from about two minutes to about twelve minutes, more preferably from about four minutes to about eleven minutes, and most preferably from about eight minutes to about ten minutes. This step may be referred to as the healing step.

Then the cheese curd mixture is gently agitated without heat for preferably from about one to about seven minutes, more preferably from about three minutes to about six minutes, and most preferably for about five minutes.

Then the cheese curd mixture is heated with agitation to a temperature in a range preferably from about 96° F. to about 115° F. (35.56°–46.11° C.), more preferably from about 98° F. to about 110° F. (36.67°–43.33° C.), and most preferably from about 100° F. to about 102° F. (37.78°–38.89° C.). The purpose of this step is to shrink the curd and to expel more whey. Since this step may be accomplished with heat being fed into the jacket of the vat in the form of steam or hot water, this step is referred to as the scalding step.

Then the heat is turned off and the agitation speed is increased slightly (5–10%). The agitation is continued for preferably from about one to about ten minutes, more preferably from about three to about nine minutes, and most preferably from about five to about eight minutes.

Then the agitator is turned off, and whey is drained off. The whey is drained in such a manner as to prevent the curds from matting together to minimize acid development. Preferably, the whey is drained in three roughly equal installments with stirring by the agitator between the installments for about 2 to 3 minutes. By the end of the third installment the whey is typically completely drained.

After all the whey has been drained, salt is added to the curd mixture. The curd mixture is preferably agitated while the salt is being added. Such salt may be Dry Coarse or Fine and the salt may be flaked or granulated. The kind of salt added is common table salt (sodium chloride). Salt may be added as a brine solution or sprayed on as a mist to the cheese curd.

The salt is added in the amount of preferably between about 1% w/w and about 8% w/w, more preferably between about 1% w/w and about 5% w/w, and most preferably between about 1% w/w and about 3% w/w. One purpose for the addition of salt is to preserve the cheese to minimize bacterial growth. The addition of sugars, as with the present invention, may cause the cheese to be more susceptible to the growth of pathogenic bacteria. Such however, is controlled by the addition of salt. Accordingly, salt is added in an amount effective for the salt to act as a preservative.

Either after salt has been added or while salt is being added (such as by mixing the salt and sugar and mixing the combination with the drained curd), sucrose or other sweeteners are added to the curd mixture. Per five pounds (2.268 kg) of finished pressed cheese, sucrose (or a nonlactose sugar having a perceived sweetness about equal to that of sucrose or fructose) is added in the range of preferably between about 2 to about 20 ounces (56.7–567 g), more preferably between about 4 to about 15 ounces (113.4–425.3 g), and most preferably between about 8 to about 12 ounces (226.8–340.2 g). The nonlactose sugar is added in an amount effective for the finished cheese product to be sweet to the tongue. For other sugars or sweeteners, the amount to be added corresponds to the above ranges for sucrose and fructose, taking into account the sweetness of one such sugar as compared to sucrose or fructose.

The following Table 1 provides a comparison of relative sweetness with sucrose being assigned the value of 100. As to Table 1, the article "Sweetener Shake-Up," *Dairy Field*, Vol. 178, No. 2, pp.59–62, (February, 1995), is hereby incorporated by reference in its entirety.

TABLE 1

| RELATIVE SWEETNESS COMPARISON | |
|---|---|
| Alitame | 200,000 |
| Sucralose | 60,000 |
| Acesulfame K (Sunnet) | 20,000 |
| Aspartame | 18,000 |
| Pure cryst. high fructose corn syrup | 170 |
| High fructose corn syrup-55 | 120 |
| High fructose corn syrup-42 | 100 |
| Sucrose | 100 |
| Glucose (dextrose) | 74 |
| High conversion (68 DE) corn syrup | 68 |
| High conversion (36 DE) corn syrup | 36 |
| Maltose | 32 |
| Galactose | 32 |
| Lactose | 16 |

It should be noted that the nonlactose sugar is preferably added to the curd after the salt has been added, and several minutes (such as from about two to five minutes, preferably closer to or at about two minutes) after the salt has been added and mixed in with the curd to permit the salt to sufficiently interact with the curd (i.e. sufficient adsorption onto the curd surfaces) such that the salt is effective as a preservative.

Sweeteners include sweet sugars in a dry or liquid form. Sweet sugars include nonlactose sugars which have a high perceived sweetness to the tongue. For the purposes of the present invention, those sugars which have a high perceived sweetness are those having a perceived sweetness at least 30% that of sucrose in the human palate (i.e. about double or more the perceived sweetness of lactose). These sugars are preferably sucrose, fructose, glucose (dextrose), corn syrups including high conversion (68 DE) corn syrup, low conversion (36 DE) corn syrup, high fructose corn syrups (HFCS) such as HFCS-42, HFCS-55, and pure crystalline HFCS, maltose, and galactose. Sucrose and fructose are even more preferred as these sugars have the highest perceived sweetness on the human palate. Sucrose is most preferred. It should be noted that the milk sugar lactose, which naturally occurs in milk, has a relatively low perceived sweetness.

It should be noted that glucose when occurring naturally in milk or in cheese is not present in an amount effective to permit the finished cheese to be sweet to the tongue. The concentration of glucose in raw milk is typically less than 0.5% w/w.

If desired, nonsugar artificial sweeteners such as aspartame and others such as the nonnutritive artificial sweetener acesulfame K (Sunett brand), the sucrose derivative with enhanced sweetness Sucralose, the nonnutritive sweetener and dipeptide amide Alitame, and the nonnutritive and noncaloric saccharin may be added to the curd in place of or with the nonlactose sugar. These nonsugar sweeteners are added in a concentration such that the finished cheese is sweet to the tongue. The sweetener preferably has a perceived sweetness at least 30% that of sucrose and may have a perceived sweetness many times that of sucrose. However, nonlactose sugars are preferred.

It should be noted that, if desired, the nonlactose sugar may be added after the whey has been drained but before the curd has been salted. However, the nonlactose sugar is added preferably at the same time the salt is being added, more preferably after the curd has been salted, and most preferably within two minutes after the curd has been salted and the salt has been mixed with the curd such that the salt is adsorbed onto the surface of the curds.

With the salt or after the salt has been added, and with or without sweet sugars or sweeteners, fruit pieces are preferably added to the cheese curd mixture. These fruit pieces are preferably dried and have no artificial coloring that could bleed into the surrounding curd after the cheese is formed. The size of the fruit pieces are about ¼ inch (0.64 cm) by about ¼ inch (0.64 cm) by about ¼ inch (0.64 cm). The fruit pieces add additional taste. Another purpose for adding the fruit is simply for visual appeal.

When all the salt and sugar has been dissolved, the cheese curds or cheese curd mixture are placed into hoops or the like for pressing. The cheese curds are preferably pressed between about 25 to about 35 pounds (11.34–15.88 kg) of pressure for about one-quarter of an hour or longer. The cheese is pressed until its moisture content is preferably between about 40% w/w and about 52% w/w, more preferably between about 42% w/w and about 49% w/w, and most preferably between about 44% w/w and about 47% w/w. The pH of the finished cheese is preferably between about 5.8 and about 6.45, more preferably between about 5.9 and about 6.40, and most preferably between about 5.9 and about 6.35.

It should be noted that from the salted and sugared curds, the finished cheese is formed by means of either hooping and pressing (the preferred means) or hooping and turning on a drain table or extruding or any like method.

The finished cheese has an integrity which is sufficiently solid to permit it to be packaged in block form and sliced by a knife without falling or crumbling apart. For example, the cheese may be sliced with a knife into slices ¼ inches (0.64 cm) thick, 2 inches (5.08 cm) high and 2 inches (5.08 cm) wide without crumbling. It can be eaten without the use of a spoon. However, it should also be noted that the cheese, if desired, may be crumbled by hand.

The finished cheese is preferably a cheese which resists melting (i.e. a nonmelting cheese). This type of cheese is defined as that whose base area increases by no more than 20% (i.e. to no more than 0.3 square inches ($1.94 \text{ cm}^2$)) when cut into a cube of one-half inch (1.27 cm) per side and placed in a 350° F. (176.67° C.) oven for five minutes. Cheeses that resist melting are those cheeses which have one or more of the following characteristics: they have a pH over 5.8; they have been made so that very little proteolysis has occurred in the cheese curd; or they have added to them ingredients and binders that prevent them from melting. Cheeses that resist melting may include more than 5% w/w of the whey proteins as denatured whey protein.

It can be appreciated that the present invention uses a cheese production technique in which the sugar is added to the cheese after the cheese curd has been formed and (preferably) salted but while it is still in the cheese vat. This technique allows the cheese to retain its natural sliceability and texture. It should be noted that the addition of sugars causes the cheese to be more crumbly and risks the development of crystals of sweetener or sugar in the cheese. Such a risk is minimized by adding the sugar to the cheese after the cheese curd has been formed but while it is still in the cheese vat.

It can further be appreciated the present invention uses a cheese production technique in which the sugar is added to the cheese after the whey has drained from the cheese curds. Putting sugar into the curd and whey mixture is a step which may be used if desired to ensure thorough mixing of the sugar and curd but such may create a high loss of sugar in the drained whey. In the most preferred form, the sugar is added to the cheese curd several minutes after the salt has been added to the cheese curd. By delaying the addition of sugar until the salt has had a chance to become incorporated in the curd, the curd is permitted to expel more moisture, thus preventing excess whey-off in the finished package.

It should be noted that the finished cheese product of the present invention has a relatively high concentration of lactose, yet this lactose has a relatively low perceived sweetness on the human palate. The present process includes little or no acid development and thus a relatively high amount of lactose remains in the finished cheese. It should be noted that most high pH cheeses already have a high concentration of milk sugar as the lactose will not have been metabolized by cheese culture. The present process adds even more sugar—or other sweetener, albeit nonlactose sugar or sweetener.

It should be noted that the finished product of the present invention includes no cheese culture. This is in contrast to natural cheese where starter or cheese cultures have been used. For example, in cheese varieties like Provolone and Parmesan, cell densities remain high ($>10^4$ cfu $g^{-1}$) even after 12 months of ripening. On the low end, varieties like Cheddar and Gouda cheese may have starter populations less than $10^3$ cfu $g^{-1}$ within the first few weeks. With the addition of sugar, such as in the present invention, cheese culture, if present, metabolizes even more sugar and thereby produces more acid which drives down the pH of the cheese.

It can thus be appreciated that natural cheese, if made from cheese culture, necessarily includes, even in its finished form, cheese culture. In contrast, the finished block product of the present invention includes no cheese culture and instead consists essentially of natural cheese, salt, and nonlactose sugar that is sweet to the tongue. And, if desired, fruit pieces may be added.

For the consumer who desires cheese with high pH, the benefits of the present invention are multiple: 1) The present process prevents excess fermentation by a cheese culture that would normally be associated with the addition of sugar to a cheese. Excess fermentation drives the pH lower than about 5.9 thereby allowing enough proteolysis to have the cheese become meltable. 2) The present process prevents ongoing fermentation over the time the cheese sits in a package in storage or on a grocery shelf, thereby reducing unsightly whey leakage in the finished package. Accordingly, the present invention allows a cheese with longer shelf life than would be possible by adding sugar to a cultured cheese and still retaining its non-melting qualities. 3) The present process prevents crumbly cheese that cannot be sliced. 4) The present process gives the finished cheese an improved taste and flavor. 5) In the most preferred form, the present process avoids excess sugar and sweetener loss in the whey.

It can further be appreciated that the present process adds the nonlactose sweet sugar or sweetener prior to the cheese curd mixture being pressed, hence prior to the cheese body being finished.

It can further be appreciated that combination of cheese culture and sweeteners produces the undesirable result of accelerated fermentation and hence lower pH and off-flavors.

The process for making the present invention is significantly different than that for making traditional cheese with fruit bits or savory seasoning. In traditional cheesemaking, when added vegetable or fruit pieces are desired in the finished product, the pieces are added during the cheese-making stage in which both the curds and whey are present in the vat. The addition of the pieces at this time allows them to be thoroughly dispersed through the curds. In traditional cheesemaking, when savory seasoning is desired in the finished product, it is added with the salt after the curd has been separated from the whey.

Neither of these processes works optimally when attempting to make sweetened cheese with little or no acid development that can be eaten without a spoon and is solid enough to be packaged in block form. Adding the fruit bits in the whey causes them to gain moisture that leaks out in the finished product. This leakage causes several problems: it tends to make the cheese too crumbly for slicing and packaging; it is unsightly; and the watery area around the fruit bit creates a place for bacteria to grow.

Adding the sweeteners in the whey, of course, is inefficient because so much of the sweetener is lost in the whey. Adding the sweeteners before the salt is problematic because it prevents the salt from fully interacting with the curd. The addition of sweeteners to the curd before the addition of salt reduces the wheying-off of the curd and increases the chances for bacterial infestation since most bacteria are salt sensitive. Adding the sweeteners with the salt is also problematic because such may cause the curd to not knit together and therefore the finished product may be too crumbly for slicing and packaging; however adding the sweetener with the salt is within the scope of the present invention, although such is not within the scope of the most preferred form of the present invention. Adding the sweeteners too late after the salting prevents the cheese curd from knitting together properly, therefore resulting in a finished product that is too crumbly. The present invention overcomes these problems by mixing the sweeteners and the fruit pieces with the salt, and then adding the salt and sweetener mixture to the curd, or preferably, adding the sweetener to the curd after the curd has been allowed to whey off, and within a sufficient amount of time after the curd has been salted. The present invention overcomes the problem of overcrumbly cheese by adding a sweetener to the curd at the same time the salt is added, more preferably by adding a sweetener to the curd within a sufficient amount of time after the salt has been added to the curd, and most preferably by stating the time and temperature conditions in which the salted cheese receives the sweetener and fruit additions, which in turn is then pressed or allowed to mold in a cheese form.

Generally, it should be noted that the present invention is for a natural cheese that is made in the absence of cheese culture, that is solid enough to be packaged in block form, that can be eaten without a spoon, that has little or no acid development, and that has sweeteners added to it other than lactose. In its most favored form, the cheese also has fruit pieces added to it. The result is a cheese that is high in moisture content (above about 44% w/w), that is high in pH (about 5.9 to about 6.35), that may be crumbled by hand yet may be sliced with a knife without falling apart, and that is sweet to the taste.

It should further be noted that cheese products may be made from the finished natural cheese of the present invention. These cheese products may include high fiber fruit cheese made by using carrageenan as a binder and fruit as an ingredient and, of course, nonlactose sweeteners as sweeteners. Such products overcome the common perception that cheese is a binder of human digestion and excretion. Other cheeses made from the present invention include Queso Blanco with guava or pineapple or mango pieces. Other cheeses made from the present invention include Ackawi with mango or watermelon or date or fig pieces.

It can further be appreciated that the finished cheese product according to the present invention has a refrigerated shelf life of one or more months with no organaleptic deterioration or bacterial contamination issues, two or more months with modest organaleptic deterioration and no bacterial contamination issues, and three or more months with saleable product that will be acceptable to consumers of the product and no bacterial contamination issues. Refrigeration for the purposes of the present invention means above about 33° F. (0.56° C.) and below about 38° F. (3.33° C.).

It can further be appreciated that the present invention uniquely includes the combination of steps of acidifying the milk to a pH below about 6.4, then initiating the step of renneting, then implementing a cheese make process that can accommodate relatively low cook temperatures such as below about 95° F. (35° C.), then cutting of the curd preferably only once, and pressing the cheese curd to a finished moisture content of above 40%.

It can further be appreciated that the present invention includes the unique combination of a relatively high pH, does not use cheese culture, and uses sugars for the purpose of added sweetening.

EXAMPLE

Step 1. Starting Material

Cow milk of the following composition is the starting material: water 87.2% w/w, fat 3.9% w/w, casein 2.5% w/w, albumen 0.7% w/w, milk sugars 5.0% w/w, and ash 0.7% w/w.

Step 2. Pasteurizing The Milk

The milk is pasteurized in non-traditional means to incorporate denatured whey proteins into the final cheese product. These denatured whey proteins will help the final cheese product to resist melting. To do so, the milk is pasteurized at 180°–182° F. (82.22°–83.33° C.) for 30 seconds in a High Temperature Short Time Pasteurize. Using a metering injection pump, phosphoric acid is injected into the raw milk line leading to the regeneration section. The milk is acidified to a pH of 6.25–6.35 as the milk enters the vat.

Step 3. Cheese Make Procedure

Rennet and calcium chloride are then mixed in with the pasteurized milk. The rennet used is microbial rennet with sodium chloride, and sodium benzoate, as preservative agents. Three ounces (85.1 g) of the microbial rennet are measured for every thousand pounds (453.6 kg) of milk. The rennet is diluted with forty volumes of cold, chorine-free water prior to being mixed with the milk. Two to six ounces (56.7–170.1 g) per one thousand pounds (453.6 kg) of milk are used for every thousand pounds (453.6 kg) of milk. The calcium chloride is diluted with forty volumes of cold chlorine-free water prior to being mixed with the milk. (Calcium chloride meets food chemical codex specifications.)

The make procedure is as follows:

a. Set temperature: 91°–93° F. (32.78°–33.89° C.).

b. Set time: 25 to 35 minutes.

c. Curd knife size: ⅛ inch (0.95 cm) cut.

d. Heal time: 8 to 10 minutes.

e. pH at cut: 6.25 to 6.35.

f. After the cut, gently agitate the cheese curds and whey for five minutes.

g. Then heat the curds and whey to 100° to 104° F. (37.78°–40° C.) for 30 to 35 minutes while maintaining agitation.

h. Increase agitation speed slightly (5–10%) and turn off the heat. Continue to agitate the curds and whey for 5 to 10 minutes.

i. Stop agitator, and drain off 50% of the volume of whey.

j. Agitate the remaining curds and whey for 2–3 minutes.

k. Drain remaining whey, with the curds preferably not being permitted to mat together.

l. After all whey has been drained, add flake salt to the curd at the rate of 2 to 8% of curd weight. Curd is preferably agitated while applying the salt.

m. Either after the salt has been added or while salt is being added, sucrose or another sweetener is added. For sucrose, add 2 to 15 ounces (56.7 g–425.3 g) per six pounds (2.722 kg) of finished cheese. Even more preferably, add 5–8 ounces (141.8–226.8 g) per six pounds (2.722 kg) of finished cheese.

n. When all salt and sugar is dissolved, put cheese curds into hoops for pressing.

o. Press at 25 to 35 pounds (11.34–15.88 kg) of pressure for one-quarter of an hour or longer. The finished cheese preferably includes a pH of 6.1 to 6.25 and a moisture content of 44% w/w or greater.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

We claim:

1. A method for making a sweetened natural cheese comprising the steps of:

a) making cheese curd without the use of a cheese culture;

b) adding a nonlactose sweetener to the cheese curd, the nonlactose sweetener having a perceived sweetness at least 30% that of sucrose and in an amount effective for the natural cheese to be sweet to the tongue; and then c) pressing the cheese curd to form a block of sweetened natural cheese.

2. The method of claim 1 and further comprising the step of adding salt to the cheese curd.

3. The method of claim 2 wherein the salt and nonlactose sweetener are added to the cheese curd simultaneously.

4. The method of claim 2 wherein the salt is added to the cheese curd prior to the nonlactose sweetener being added.

5. The method of claim 1 further comprising the step of adding fruit pieces to the cheese curd.

6. The method of claim 4 wherein the curd has sufficient integrity to be packaged in block form and wherein the natural cheese is made in the absence of cheese culture.

7. The method of claim 6, wherein the cheese has a pH ranging from about 5.9 to about 6.35.

8. The method of claim 7 wherein the cheese curd is made by acidifying with only an edible acid and wherein the salt comprises about 1% to 8% by weight of the cheese.

9. The method of claim 8 wherein the sweetener is selected from the group consisting of sucrose, fructose, glucose, corn syrups, pure crystalline high fructose corn syrup, maltose, and galactose.

10. A method for making a sweetened natural cheese comprising the steps of:

a) pasteurizing milk; then b) coagulating the milk with a rennet and without a cheese culture to obtain a cheese curd; then c) cutting the curd; then d) permitting the curd to heal; then e) scalding the curd; then f) permitting whey to drain from the curd; then g) mixing salt in with the curd in an amount effective for the salt to act as a preservative for the natural cheese;

h) permitting the salt to sufficiently interact with the curd;

i) mixing a nonlactose sweetener in with the curds, the nonlactose sweetener having a perceived sweetness at least 30% that of sucrose and being mixed in the curd in an amount effective for the natural cheese to be sweet to the tongue; then j) pressing the curd to a block form to obtain a sweetened natural cheese.

11. The method of claim 10 comprising the steps of:

a) pasteurizing milk at a temperature of about 88° to 95°; then b) coagulating the milk with a rennet and without a cheese culture to a pH of about 5.9 to about 6.35 to obtain a cheese curd; then c) cutting the curd and stirring to release whey not more than twice; then d) permitting the curd to heal without agitation; then e) scalding the curd at about 96° to 115° F.; then f) permitting whey to drain from the curd; then g) mixing about 1% to about 8% salt in with the curd in an amount effective for the salt to act as a preservative for the natural cheese;

h) permitting the salt to sufficiently interact with the curd;

i) mixing about 2 to 20 ounces of a nonlactose sweetener in with the curds per five pounds, with the nonlactose sweetener having a perceived sweetness at least 30% that of sucrose and being mixed in the curd in an amount effective for the natural cheese to be sweet to the tongue; and then j) pressing the curd to a block form to obtain a sweetened natural cheese.

12. The method of claim 11 wherein the sweetener is selected from the group consisting of sucrose, fructose, glucose, corn syrups, pure crystalline high fructose corn syrup, maltose, and galactose.

13. The method of claim 11 wherein the natural cheese has a base area which increases by no more than 20% when cut into a cube of one-half inch (1.27 cm) per side and placed in a 350° F. (176.67° C.) oven for five minutes.

14. A method for making a sweetened natural cheese comprising the step of mixing a nonlactose sweetener in with cheese curd coagulated in the absence of culture, the nonlactose sweetener having a perceived sweetness at least 30% that of sucrose and being mixed in with the cheese curd in an amount effective for the natural cheese to be sweet to the tongue.

15. The method of claim 14 further comprising the step of pressing the cheese curd after the nonlactose sweetener has been added.

16. The method of claim 14 further comprising the step of adding salt to the cheese curd and permitting the salt to interact with the cheese curd prior to adding the nonlactose sweetener into the curd.

* * * * *